United States Patent [19]

Thudt

[11] Patent Number: 4,777,887

[45] Date of Patent: Oct. 18, 1988

[54] TRACK GUIDING DEVICE FOR A TRACK GUIDED VEHICLE

[75] Inventor: Hubert Thudt, Puchheim/Bahnhof, Fed. Rep. of Germany

[73] Assignee: MAN Nutzfahrzeuge GmbH, Munich, Fed. Rep. of Germany

[21] Appl. No.: 76,775

[22] Filed: Jul. 23, 1987

[30] Foreign Application Priority Data

Jul. 25, 1986 [DE] Fed. Rep. of Germany ....... 3625283

[51] Int. Cl.⁴ .......................... B62D 1/26; B60B 37/00
[52] U.S. Cl. ..................................... 104/247; 301/128
[58] Field of Search ............... 104/242, 243, 245, 247; 180/79, 131; 295/44; 301/1, 124 R, 128

[56] References Cited

U.S. PATENT DOCUMENTS

| | | | |
|---|---|---|---|
| 2,676,849 | 4/1954 | Houck et al. | 301/128 |
| 2,681,231 | 6/1954 | Kondracki | 301/128 |
| 2,726,106 | 12/1955 | Houck | 301/128 |
| 2,750,199 | 6/1956 | Hart | 301/128 |
| 3,099,491 | 7/1963 | Peras | 104/247 |
| 3,279,831 | 10/1966 | Smelcer et al. | 301/1 |
| 4,092,930 | 6/1978 | Takemura et al. | 104/247 |
| 4,301,739 | 11/1981 | Mehren et al. | 180/131 |
| 4,317,596 | 3/1982 | Lemmon | 301/128 |
| 4,436,170 | 3/1984 | Mehren et al. | 104/247 |

FOREIGN PATENT DOCUMENTS

| | | | |
|---|---|---|---|
| 3103488 | 12/1982 | Fed. Rep. of Germany | 104/247 |
| 0018619 | 2/1977 | Japan | 104/247 |
| 0043212 | 4/1977 | Japan | 104/247 |

*Primary Examiner*—George L. Walton
*Attorney, Agent, or Firm*—Scully, Scott, Murphy & Presser

[57] ABSTRACT

A roller holder for a track steered vehicle consists of functional elements which are detachably joined together, that is to say a head part with a roller height adjustment means, a center part with an annular preferential point of weakness cross section and a connecting part with an arresting means. With its connecting part the roller holder runs on a follower arm for adjustment to track width and the holder is able to be slid along the arm and able to be fixed at any desired position by means of the arresting means within the range of sliding. Furthermore, there is a safety strap in the roller holder which prevents loss of the roller holder if it should break off.

13 Claims, 5 Drawing Sheets

TRACK GUIDING DEVICE FOR A TRACK GUIDED VEHICLE

BACKGROUND OF THE INVENTION

The invention relates to a track guiding device for a track guided vehicle comprising at least one follower roller associated with one side of the vehicle and adapted to cooperate with a tracking lane wall then the vehicle is being guided by the device, said roller being arranged on a roller holder which is attached to a follower arm and has a bilateral preferential point of weakness therein and a safety strap secured to said holder at points before and beyond said point of weakness so that if the holder breaks its part which breaks off and the roller attached thereto will be held captive.

Such a track guiding device has been described in the German Pat. No. 3,103,488 whose roller holder is made up of a number of parts that are welded together as an integral structure. The result of this is that in the event of breakage the complete holder has to be replaced. Furthermore, this known holder has a preferential point of weakness produced by peripheral cuts as transverse slots. The result of this is an uneven distribution of forces in the roller holder and this leads to substantial bending if the holder is subjected to heavy follower roller forces which are however not sufficient to cause fracture. Lastly this known roller holder is a stationarily arranged component with the result that for adjustment in height and adjustment to suit the width for track different and generally very elaborate adjustment means have to be provided.

OUTLINE OF THE INVENTION

Accordingly one object of the present invention is to so design a track guiding device of the initially mentioned type that more favorable force characteristics are produced in the plane of preferential fracture of the roller holder.

A further aim of the invention is to ensure that in the event of a fracture of the roller holder the latter does not have to be replaced in its entirety.

A still further aim of the invention is to ensure that adjustment of the follower roller as regards the width of the track and the height may be carried out using simple means.

Accordingly in order to meet these or other objects of the invention appearing from the present specification and claims, the roller holder consists of functional elements which are detachably joined together, that is to say a head part with a roller height adjustment means, a center part with an annular preferential point of weakness cross section and an connecting part with an arresting means. With its connecting part the roller holder runs on a follower arm for adjustment to track width and the holder is able to be slid along the arm and able to be fixed at any desired position by means of the arresting means within the range of sliding. Furthermore, there is a safety strap in the roller holder which prevents loss of the roller holder if it should break off.

Owing to the fact that the roller holder is made up of a number of detachable functional elements joined together, that is to say a head part, a center part and an connecting part it is no longer necessary for the complete roller holder to be replaced if it should break. In order to carry out a repair the function of the roller holder is restored by simply replacing the center part which has fractured at the preferential point of weakness by a new center part which is screwed to the other parts of the roller holder.

Owing to the fact that the center part furthermore has an annular cross section where fracture is intended, at the latter there is a circumferentially even distribution of forces in the roller holder and this avoids unintended bending of the roller holder owing to heavy blows or the action of forces transmitted by the follower roller.

A further point is that as a whole the roller holder is so designed that simple adjustment as to height and the width of the track may be carried out by means of individual parts of the roller holder.

The track guiding device of the present invention will now be described in more detail with reference to a working example thereof as shown in the drawings.

LIST OF THE SEVERAL VIEWS OF THE FIGURES

DETAILED ACCOUNT OF EMBODIMENT OF THE INVENTION

Figure 1:
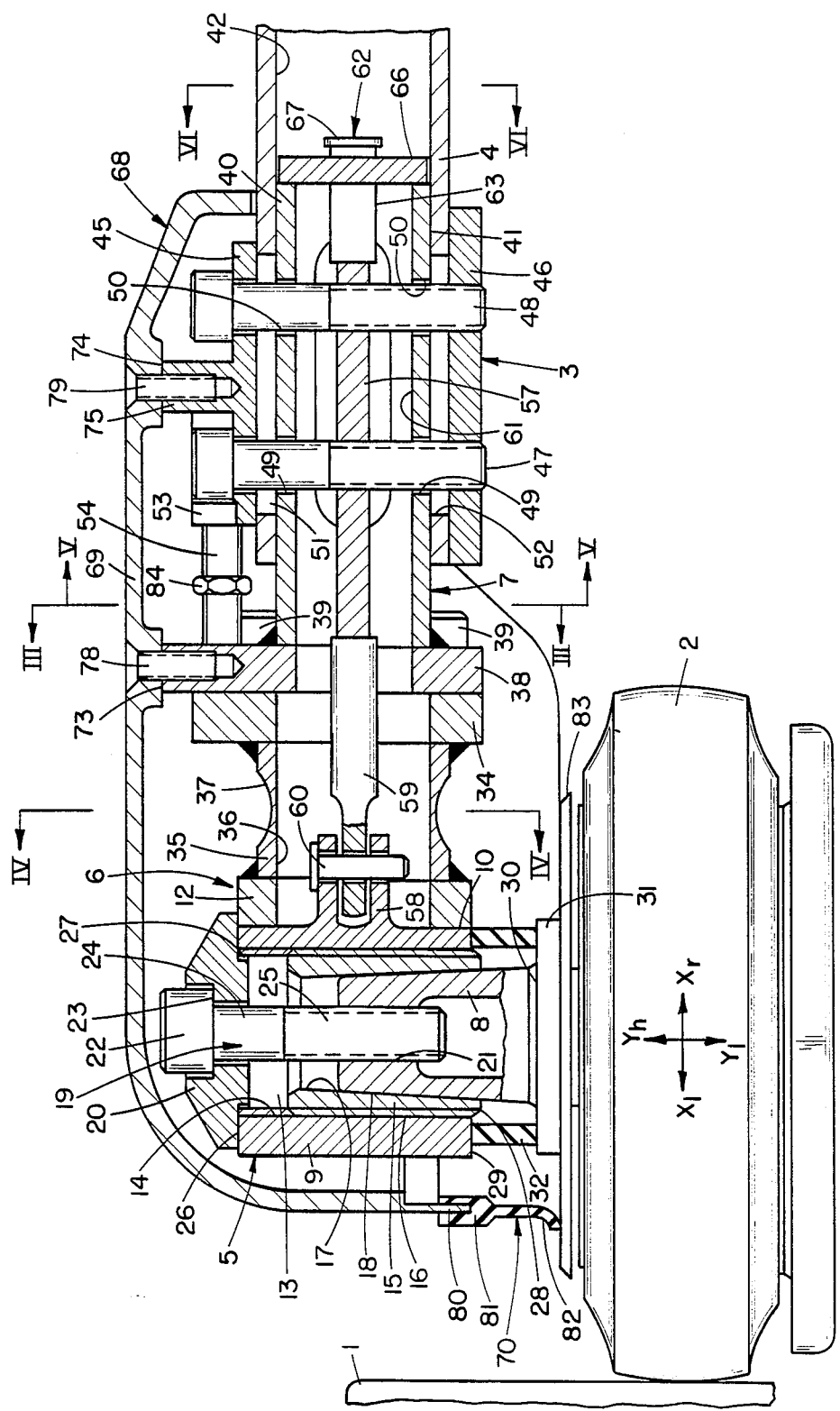
FIG. 1 is a vertical longitudinal section taken through the holder of a follower roller on a track guided vehicle.
Figure 2:
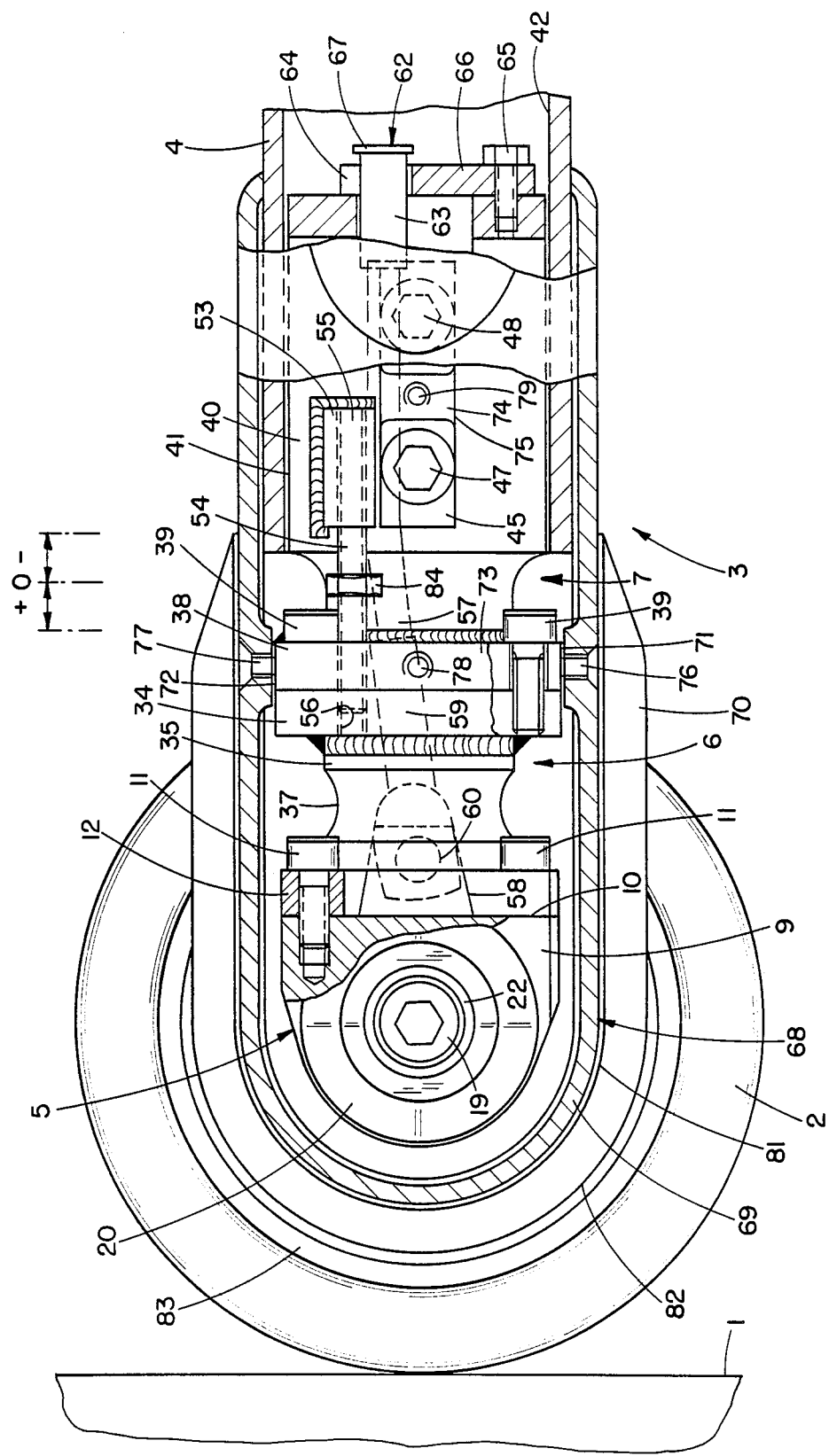
FIG. 2 shows the follower roller holder as in FIG. 1 in plan view with the guard cover partly broken away.

In connection with a track guided vehicle, as for instance an omnibus, it is necessary to have a track guiding device which takes effect on the steering system of the vehicle and receives respective steering commands from at least one track guiding lane means, i. e. something that is sensed by the follower roller. The track guiding device described in what follows cooperates with track guiding lane walls arranged on both sides of the vehicle that is to be guided. One such track guiding lane wall is shown in part in FIGS. 1 and 2 and referenced 1. The track guiding lane walls are secured to the street or road as fixed part thereof and form the limits thereof for the vehicle when the latter is being track guided.

The track guiding device has at least one follower roller 2 associated with one side of the vehicle and adapted to cooperate during operation with a track guiding lane wall. The roller 2 is mounted on a roller holder 3 so that it may rotate. The roller holder 3 itself is secured to a follower arm 4 which in cooperation with other parts of the track guiding device takes effect on the steering of the vehicle.

Figure 4:
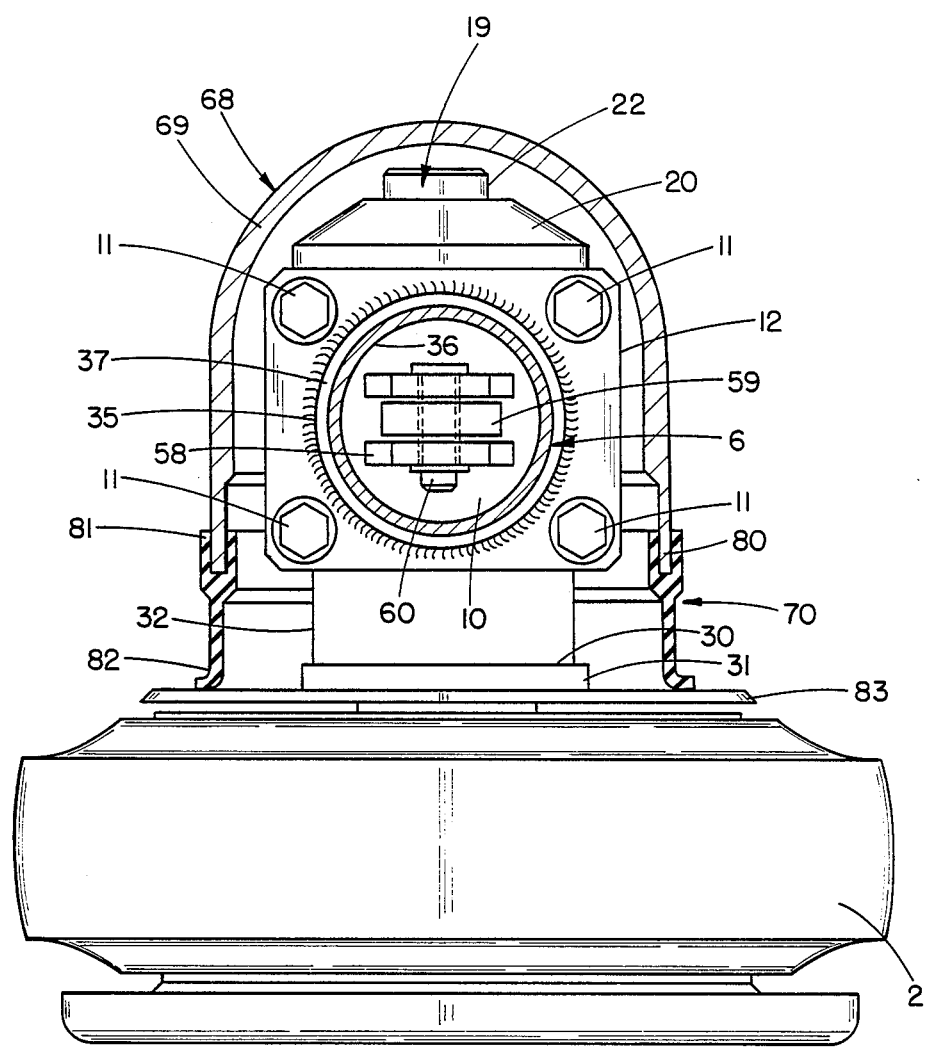
FIG. 4 is a section taken through the follower roller holder on the line IV—IV of FIG. 1.

The roller holder 3 consists of a number of functional elements which are detachably joined together and comprise a head part 5, a center part 6 and an connecting part 7. It is by means of the latter that the roller holder 3 is connected to the follower arm 4. The head part 5 is designed to hold a roller journal pin 8 and a height adjustment device for the follower roller 2. The head part 5 consists of a bearing member 9 on which there is an outer flat abutment surface 10 on which the center part 6 of the roller holder 3 bears. Furthermore in this bearing member 9 there are a number of tapped holes for screwing the roller holder center part 6 in position. The four screws 11 used for this purpose are to be seen in section in FIG. 4. The screws have their shanks extending though respective through holes in the outer flange 12 of the center part 6 so that they fit into the said tapped holes in the bearing member 9. The bearing member 9 is furthermore provided with a central through hole 13 arranged to be coaxial to the follower roller. There is a continuous internal thread 14 in the hole 13. An adjusting sleeve 15 has a continuous external thread 16 which is screwed into the hole 13. This sleeve 15 forms a part of the means for adjusting the height of the roller. This adjusting sleeve 15 has a conical through hole 17 which widens in diameter towards the follower roller 2 and is coaxial to it. An external conical part 18 on the roller journal pin 8 fits into it. A further part of the roller height adjusting means is a threaded draw rod 19 which is also coaxial to the roller and whose one end is in a holder plate 20 bearing on the bearing member 9 of the head part 5 and whose other end is received in a hole 21 in the roller pin 8. The draw rod 19 is so fitted in place that by turning it the conical part 18 of the roller journal pin 8 may be moved into the conical through hole 17 in the adjustment sleeve 15. For causing such axial advance there has to be a suitable thread either in the holding plate 20 or in the receiving hole 21 and furthermore the draw rod 19 has to bear on a shoulder on the holder plate 20 of on the roller journal pin 8. In the arrangement shown the draw rod 19 has its head 22 bearing at one end thereof on a support surface 23 present on the holder plate 20, while its shank 24 runs coaxially in a through hole in the holder plate 20 and its thread 25 is screwed into a male thread cut in the wall of the receiving hole 21 of the roller pin 8. The holder plate 20 itself is supported on an upper end surface 26 of the bearing member 9 and is positioned in the through hole 13 thereof by means of an axially projecting positioning pin 27. To adjust the roller to the correct height in relation to the track guiding lane wall 1 the first step is to move the adjusting sleeve 16 into a suitable axial position within the bearing member 9 and then to tighten the draw rod 19 so as to move the roller pin 8 into engagement with the adjusting sleeve 15. The correct setting of the adjusting sleeve 15 may be found with reference to its lower edge 28 in relation to the lower edge 29 of the bearing member 9 and then checked. After such an adjustment operation a sealing ring 32 is then fitted between the lower edge 29 of the baring member 9 and the upper edge 30 of a collar 31 on the roller pin 8. This sealing ring 32 may however also be so flexible that it is able to take part in all setting movements. The above-described vertical adjustment of the follower roller 2 using the height adjustment device is symbolized in FIG. 1 in the adjustment cross 33 shown adjacent to the follower roller 2 by the arrows $y_h$ and $y_l$.

Figure 3:
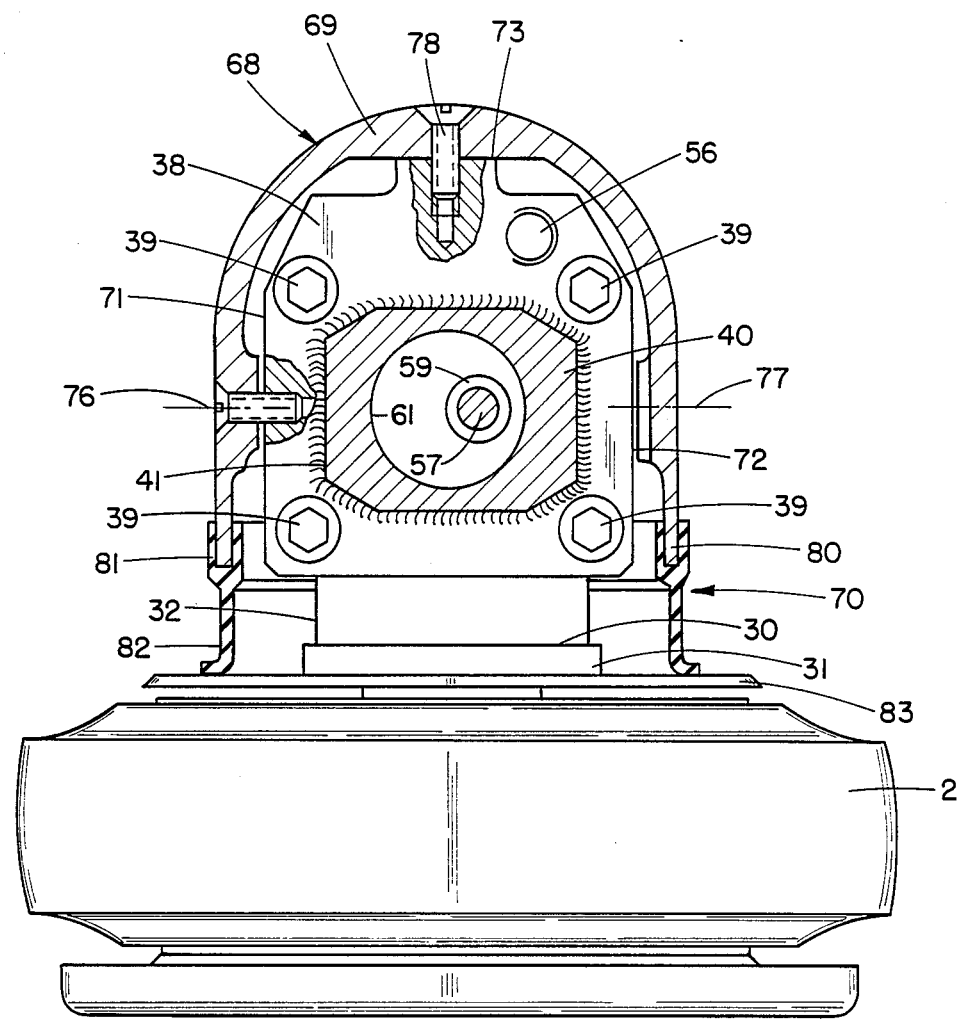
FIG. 3 is a section taken through the follower roller holder on the line III—III of FIG. 1.
Figure 5:
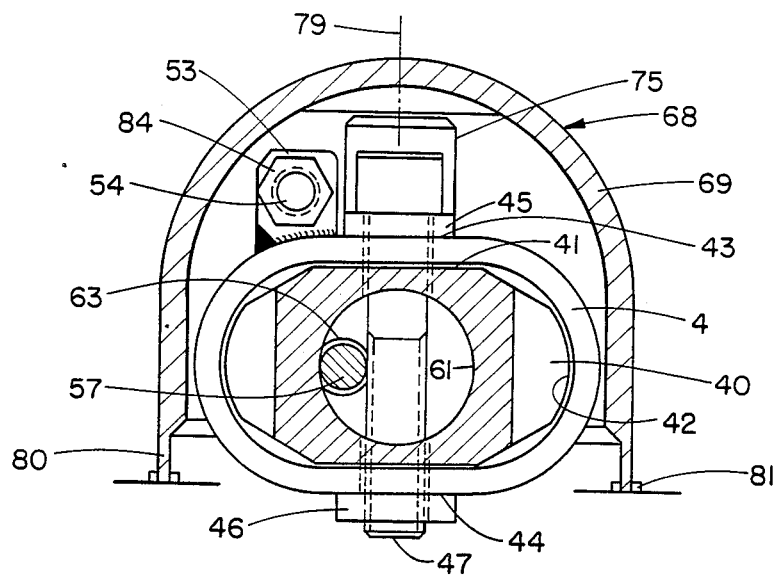
FIG. 5 shows a section taken on the section line V—V of FIG. 1 of the follower roller holder.
Figure 6:
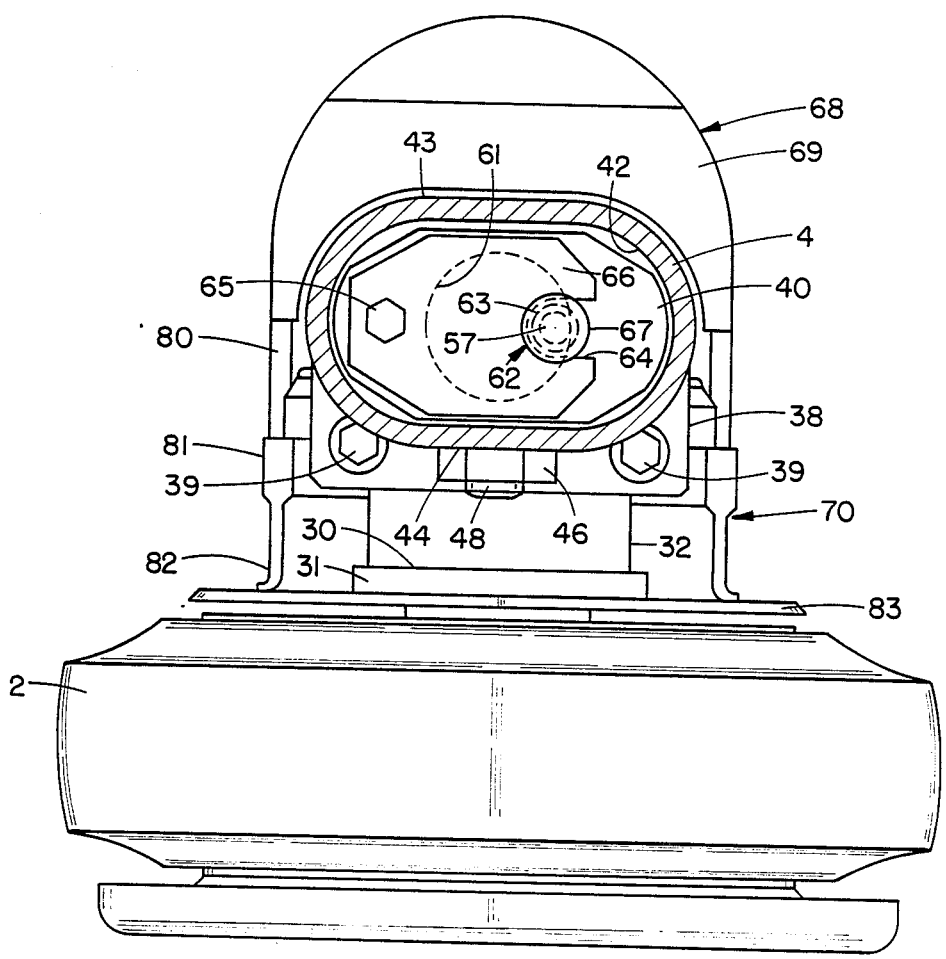
FIG. 6 is a section through the follower roller holder taken on the line VI—VI of FIG. 1.

In addition to the above-mentioned external flange 12 the center part 6 of the roller holder 3 consists of an internal flange 34 and a preferential fracture member 35 spacing the two flanges 12 and 34 apart. The member 35 is in the form of a tubular section having a circular annular cross section. The two flanges 12 and 34 are formed by two flat plates and each of them is welded to one end face of the preferential fracture member 35. Each of the two flanges 12 and 34 furthermore has a through hole aligned with the internal hole in the preferential fracture member and having the same diameter as it so that there is a hole 36 running right the way through the center part 6. The center part 6 is furthermore designed to form a preferential fracture means of the roller holder 3. Such a preferential fracture means is to be provided for reasons of safety and more particularly to avoid damage to the further members attached to the roller holder of the track guiding device and the vehicle steering gear. The preferential fracture means is provided on the tubular preferential fracture member 35 generally halfway along its length by having a peripheral groove 37 with a circularly arcuate form of the floor of the groove so that there is an annular cross section to the preferential fracture means remaining constant around the axis and present at the deepest point of the groove 37 in connection with the wall of the inner hole 36 in the preferential fracture member 35. The flat connecting flange 38 of the connecting part 7 is fitted on the outer, flat end surface of the inner flange 34 of the center part 6. For attachment of the flange 38 to the center part 6 there are means in the two flanges 34 and 38 for screw attachment. These means are in the form of threaded holes or through holes for receiving four screws 39 whose precise arrangement will be seen from the sectional view of FIG. 3. The connecting part 7 of the roller holder 3 consists of the above-mentioned connecting flange 38 and of a sliding cylinder 40, which has an uneven external form 41, i. e. one departing from a circular form—see also FIGS. 3, 5 and 6, to fit into a suitably adapted receiving hole 42 in the follower arm 4 which at least at its free end is of tubular construction. The arm may slide on the cylinder 40 but is not able to be turned in relation thereto. Owing to this arrangement of the connecting part 7 in the follower 4 to allow longitudinal sliding motion adjustment to suit the width of the track to the two sides of neutral position o in the positive (+) or negative (−) directions is possible, see the diagram in FIG. 2 adjacent to the view of the assembly, or, as indicated in the adjustment cross 33 in FIG. 1 in the form of motion indicated by $x_l$ and $x_r$. Furthermore the connecting part 7 is provided with an arresting device with which the roller holder 3 may be located at any position of adjustment within a given displacement range. This arresting device comprises two clamping plates 45 and 46 bearing on two diametrally opposite, parallel external surfaces 43 and 44 on the follower arm 4, see FIGS. 1 and 5—which are able to be moved towards each other by clamping screw means on the follower arm 4. The clamping screw means consists of at least one screw which however in the present working example of the invention is in the form of two clamping screws 47 and 48 whose shanks extend through respective holes in the clamping plate 45 and furthermore in a transverse hole 49 or 50, respectively, in the sliding cylinder 40 so as to extend right the way through the same and to be held therein and furthermore extend through two longitudinal grooves 51 and 52, provided diametrally opposite parts of the follower arm 4. Such grooves 51 and 52 are parallel to the longitudinal direction of the displacement and the length thereof defines and limits the longitudinal extent of displacement of the sliding cylinder 40 for the adjustment of the track width of the follower roller 2. In the working example shown the clamping screws 47 have their heads (which have a larger diameter than the shanks) bearing on support faces on the clamping plate 45 and their threaded shank parts are received in corresponding tapped holes in the clamping plate 46 so that by tightening the two clamping screws 47 and 48 the two clamping plates 45 and 46 will be moved towards each other and pressed against the outer surfaces 43 and 44 of the follower arm 4.

In order to make possible highly accurate adjustment of the roller holder 3 during setting the track width and simultaneously to provide for additional security of the setting motion, the arresting device is provided with a setting device with which the axial displacement of the roller holder 3 on the sensing arm 4 may be carried out in the one or the other direction. This setting device consists of a setting mount 53 welded or other otherwise immovably secured to the follower arm 4—see more especially FIG. 5—and a threaded setting bolt 54 whose one end fits into the mount 53 and whose other end fits into the connecting flange 38 and possibly in the inner flange 34 of the center part 6 and is secured therein in a respective receiving hole 55 or 56, of which at least one has a setting thread.

There are furthermore stationary means 84 on the threaded setting bolt 54, as for example in the form of a welded-on hex nut, which may be turned by means of a tool. The threaded setting bolt 54 itself extends parallel to the direction of setting and so makes it possible, when it is turned, to conveniently perform an exact setting of the roller holder 3 to bring it into any desired position as may be desired having regard to the nature of the track guiding lane wall 1.

Despite an exact track guiding action during operation of the vehicle it may be the case, as for example on introducing the device into the track or on running over an obstacle within the track guiding lane, that the load transmitted by the follower roller 2 to the track guiding device is so heavy that the roller holder 3 breaks off at the preferential fracture position in the center part 6. In order to ensure that the broken off part together with the follower roller 2 does not simply drop off the vehicle and be lost, there is a safety strap 57 or cord within the roller holder 3 preventing such loss. This safety strap in the roller holder 3 is jointed on the one side of the preferential fracture point to the head part 5 and on the other side thereof to the connecting part 7. In this respect for locating the outer end of the safety strap 57 on the bearing member 9 of the head part 5 the support surface 10 of the latter has an axially projecting bearing eye 58 in which the outer connecting prt 59 of the safety strap 57 is secured by means of a threaded bolt 60. In order to ensure on the one hand that the roller holder part which breaks off is held as securely as possible while on the other hand avoiding interference with the setting and adjustment of the roller holder 3 in relation to the follower arm 4, the safety strap having its outer connecting part 59 within the hole 36 in the center part 6 is also arranged to extend through a central through hole 61 which is coaxial to the direction of sliding, in the connecting part and is furthermore extended past the shanks of the clamping screws 47 and 48 and its inner end is held in place by means of a retaining head 62 at the inner end of the sliding cylinder 40. The retaining head 62 is in this case made up of a cylindrical safety sleeve 63, which is firmly connected to the inner end of the safety strap 57 and which is extended through a safety opening 64 in the safety plate 66 which is arranged at the inner end of the sliding cylinder 40 and held therein by means of a screw 65 and it is locked by means of a safety head 67 having a larger diameter than the safety sleeve 63. Such a construction of the inner end of the safety strap 58 means that there is no interference with the setting of the roller holder 3 in relation to the follower part 4.

In order to protect the roller holder 3 and the connection of the follower roller on the latter there is a guard cap 68 which in the present case is made up of two parts, that is to say an upper cap part 69, fashioned for example of glass fiber reinforced plastic and a lower cap part 70 made for example of flexible rubber or plastic material. The upper cap part 69 is supported at a number of points on the roller holder 3, that is to say on the two lateral surfaces 71 and 72 and on the upper end surface 73 on the connecting flange 38 of the connecting part 7 and furthermore on the external end surface 74 of a projecting mount 75 on the clamping plate 45 and adjacent to the said positions by means of respective screws 76, 77, 78 and 79. The lower cap part 70 is fitted to and held by a connecting rib 80 on the upper cap part 69 owing to the presence of a clamping bead 81. Adjoining the clamping bead 81 there is flexible cuff 82 whose outer end is supported on a support plate 83 independently of the axial position of setting of the follower roller 2. This plate 83 forms a part of the roller journal pin 8 and is adjacent to its collar 31. Such a design of guard cap ensures that all the main parts of the roller holder are protected against rain, snow and hail during operation of the vehicle. Furthermore the flexibility of the cuff 82 on the lower cap part 70 ensures that height adjustment of the follower roller 2 may be carried out at any time.

I claim:

1. A track guiding device for a track guided vehicle comprising at least one follower roller associated with one side of the vehicle and adapted to cooperate with a tracking lane wall when the vehicle is being guided by the device, said roller being arranged on a roller holder which is attached to a follower arm and has a preferential point of weakness therein and a safety strap secured to said holder at points before and beyond said point of weakness so that upon fracture of the holder its part which breaks off and the roller attached thereto will be held captive, wherein: the roller holder comprises a number of functional elements detachably joined together, said elements including (a) a head part with a means for adjusting the height of the follower roller,
   (b) a center part with an annular cross section part adapted to preferentially fracture in the event of said holder being subjected to a heavy stress,
   (c) an connecting part with an arresting means by way of which the roller holder may be guided for adjusting track width, is able to be longitudinally slid on to the same and may be located by means of the arresting means within the range of displacement at a desired position, and wherein the safety strap is jointed at the one end to the head part and at the other end to the connecting part of the roller holder.

2. The track guiding device as claimed in claim 1 wherein said roller holder is covered by a guard cap which at least partly surrounds it and is more especially arranged over it.

3. The track guiding device as claimed in claim 1 wherein said head part of the roller holder consists of a bearing member which possesses an external support surface for the center part and has threaded holes for the screw connection of the latter, and which furthermore adjacent to the support surface has a bearing eye for the detachable linking thereto of the outer end of the safety strap and furthermore has a central through hole which is coaxial to the follower roller and has a female thread therein.

4. The track guiding device as claimed in claim 3 wherein the follower roller height adjusting means comprises an adjusting sleeve which has an external screw thread making it able to be adjusted in the female thread of the through hole in the bearing member in an axial direction, and a conical through hole coaxial to the follower roller, said conical hole becoming wider towards the follower roller to which a male cone on the roller journal pin supporting the follower roller is fitted and wherein as the follower roller height adjusting means has a draw rod which is coaxial to the follower roller and which at one end interlocks with a holding plate arranged at the head end of the bearing member and at the other end is fitted in a receiving hole in the roller journal pin and when turned makes possible an inward drawing motion of the roller pin into the through hole of the adjustment sleeve until a clamping engagement is achieved.

5. The track guiding device as claimed in claim 1 wherein the center part of the roller holder has a central through hole and the central part has the preferential fracture means formed by a tubular section and two flanges arranged at the end thereof, said flanges having flat outer end surfaces and wherein on the outer flange there holes for the insertion of shanks of screws for attachment of the central part on the head part and on the inner flange there are means in the form of tapped holes or through holes, for screwing the central part to the connecting part of the roller holder.

6. The track guiding as claimed in claim 5 wherein the annular preferential fracture cross section of the preferential fracture means of the central part is formed by a externally extending groove generally halfway along the extent thereof and having a circularly arcuate groove floor, whose deepest part in connection with the wall of the central through hole results in the circumferential constant preferential fracture cross section.

7. The track guiding as claimed in claim 5 wherein the two flanges of the center part are welded to the preferential fracture means thereof.

8. The track guiding device as claimed in claim 1 wherein the connecting part of the roller holder consists of a sliding cylinder and a connection flange welded thereto, with which it is joined to the center part at the inner flanger thereof by way of screws extending through screw holes and wherein the sliding cylinder has an irregular outline fitting into a suitable receiving hole so that it may be moved axially but not rotationally, in the tubular free end of the follower arm.

9. The track guiding device as claimed in claim 8 wherein the sliding cylinder has a through hole coaxial to the longitudinal axis through which the safety strap may be received, said strap having a retainer head at its inner end and is so fitted in a holding plate fixed to the inner end surface of the sliding cylinder in a safety opening as to make possible free sliding of the sliding cylinder within the follower arm.

10. The track guiding device as claimed in claim 1 wherein the arresting means associated with the connecting part of the roller holder consists of two diametrally opposite, parallel clamping plates, which are able to be pressed together by clamping screw means onto the follower arm, said clamping screw means comprising at least one clamping screw and more specially two such screws, each such screw having a shank extending through the clamping plate and being fitted in a transverse hole in the sliding cylinder so as to pass through it in a direction perpendicular to the longitudinal axis and furthermore two diametrally opposite parts of the follower arm constituting with longitudinal grooves which limit the extent of displacement of the sliding cylinder for the setting of the track width using the roller holder.

11. The track guiding device as claimed in claim 10 wherein the arresting device has an associated setting means for the performance of an axial displacement of the roller holder on the follower arm in one of two directions and which consists of a setting mount externally and stationarily arranged on the follower arm and a threaded setting bolt which at one end is fitted in the mount and at the other end is fitted in the connection flange of the connecting part and possibly in the inner flange of the center part in respective holes allowing rotary motion and at least one of such holes has a setting screw thread and wherein there are means on the threaded setting bolt for turning the latter by means of a tool.

12. The track guiding device as claimed in claim 10 wherein the guard cap is made up of two parts in the form of an upper cap part and of high-impact plastic material and a lower cap part of flexible rubber or plastic material.

13. The track guiding device as claimed in claim 12 wherein the guard cap is supported on the roller holder via projections thereof or on the roller holder on supporting surfaces on different individual parts thereof and is screwed to the part thereof.

* * * * *